Oct. 12, 1948.   N. R. KRAUSE   2,451,227
SELF-CLEANING SCREEN OR FILTER
Filed Oct. 23, 1944   2 Sheets-Sheet 1
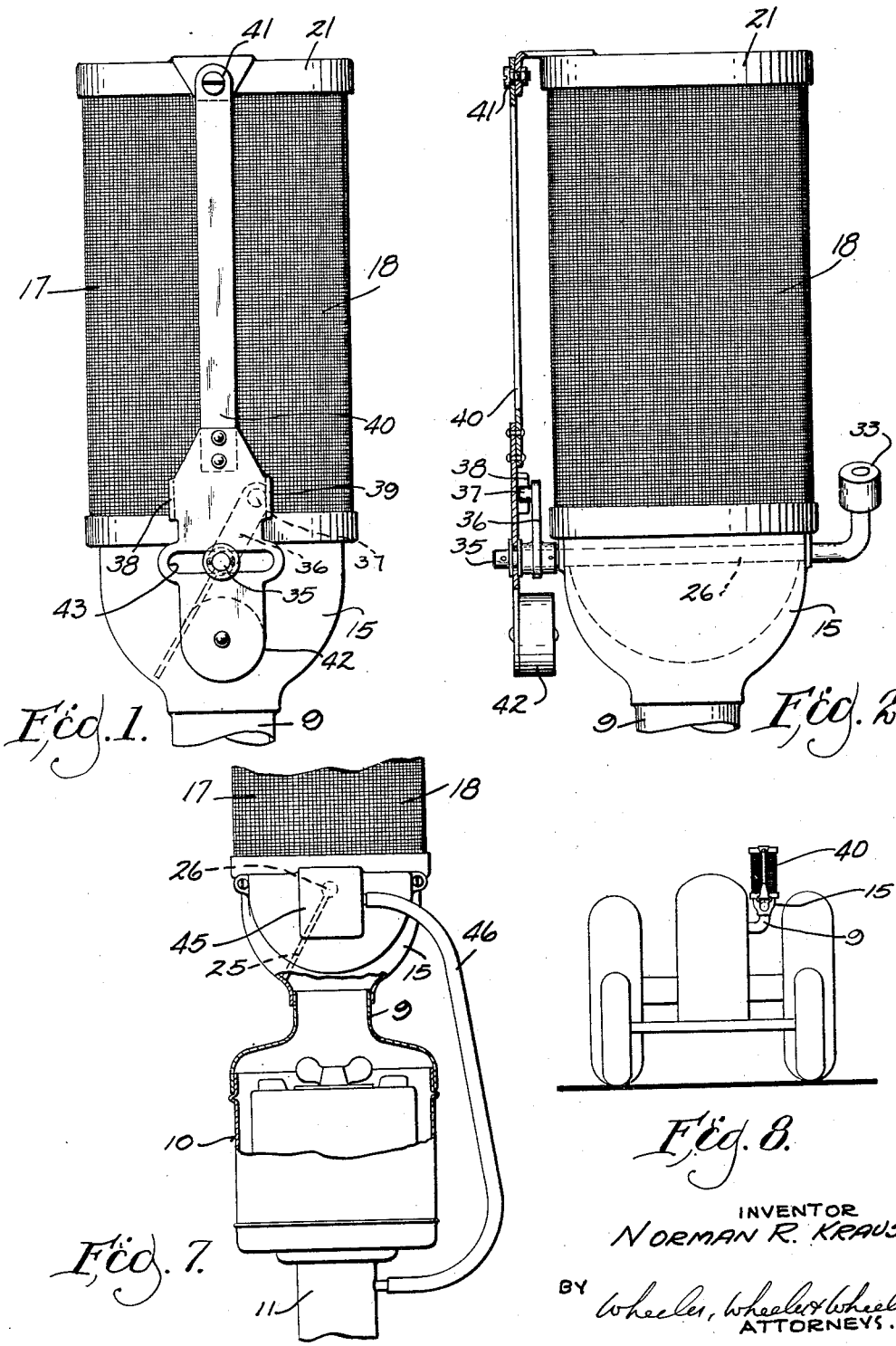
INVENTOR
NORMAN R. KRAUSE
BY Wheeler, Wheeler & Wheeler
ATTORNEYS.

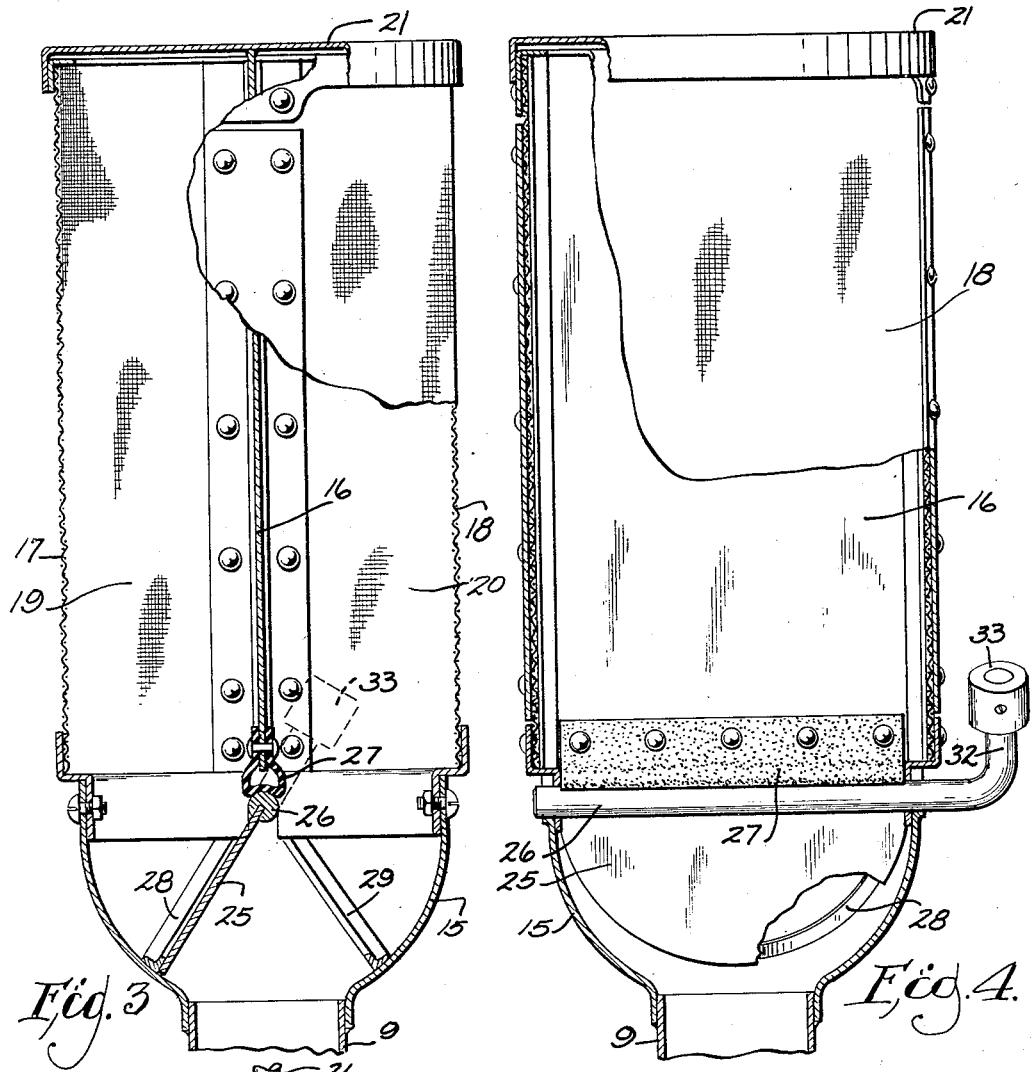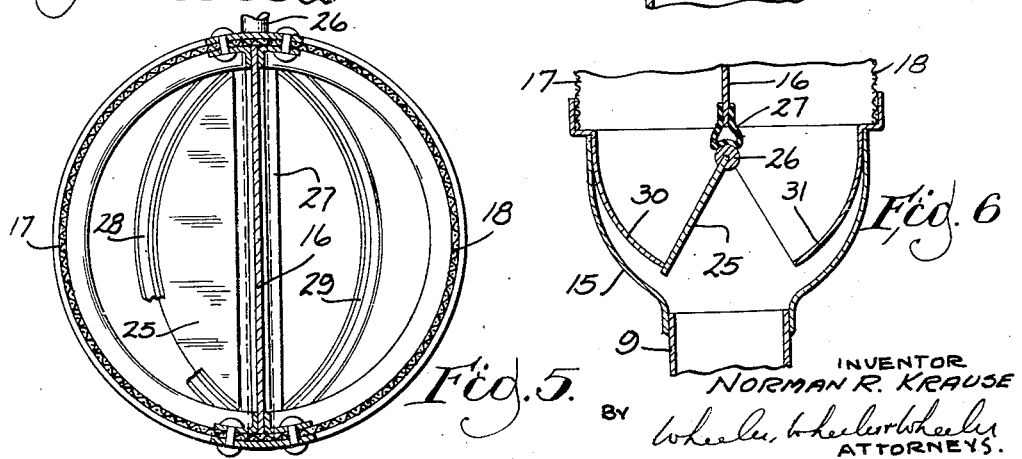

Patented Oct. 12, 1948

2,451,227

UNITED STATES PATENT OFFICE 2,451,227

SELF-CLEANING SCREEN OR FILTER

Norman R. Krause, Racine, Wis.

Application October 23, 1944, Serial No. 559,871

6 Claims. (Cl. 183—53)

This invention relates to improvements in self-cleaning screens or filters. The invention has particular utility when used as a pre-cleaner for internal combustion engines in agricultural machinery and the like, and will be specifically described with reference to its use in that field, it being understood, however, that certain aspects of the invention are generically applicable to other fields of use.

It is the primary object of the invention to provide a screen or filter which will automatically rid itself of foreign matter tending to accumulate upon it.

Almost all internal combustion engines used in the agricultural machinery field now include in some form a filter for removing fine or abrasive dust from the air en route to the engine carburetor. The most effective devices of this type usually filter the intake air through oil-coated screens or other porous material which is highly effective to remove fine dust but which would speedily be clogged and rendered inoperative if exposed to coarser material such as commonly enters with the intake air.

Accordingly, it is common to employ some sort of pre-cleaner for removal of the coarser material such as chaff, straw or leaves. A simple screen will function adequately as a pre-cleaner until it becomes choked. Under agricultural conditions, however, the pre-cleaner may require almost constant attention on the part of the operator for, long before it is completely choked, it may be choked sufficiently to affect performance of the engine whose intake air passes through the pre-cleaner.

Most of the coarse material will drop from the pre-cleaner screen by itself as soon as it is relieved of the differential pressure created by the flow of air through the screen. The present invention has for its object a multiple screened intake with means for automatically diverting air from time to time from one intake to the other so that each intake, in turn, will be relieved of flow and the chaff, leaves, straw and paper clinging thereto will fall by gravity from the screen. By assuring that the change of flow as between the several screens occurs with sufficient frequency, an engine air supply of substantially constant characteristics will result while, at the same time, the very fine dust filter will be protected from the coarse material which would speedily choke it.

It is my purpose to provide a number of different means by which air may be diverted from one intake screen to another for satisfying the objectives of this invention. Moreover, it is my purpose to provide means in which the valve controlling air diversion may be made to operate subject to the control of a single operating means or, alternatively, of any one of several operating means.

Other objects of the invention will be apparent in more detail from the following disclosure of the invention.

In the drawings:

Fig. 1 is a front elevation of a device employing the invention.

Fig. 2 is a side elevation of the device shown in Fig. 1, portions of the controls being broken away to a vertical section.

Fig. 3 is a view on a larger scale showing in transverse section a device embodying the invention.

Fig. 4 is a view similar to Fig. 3 taken in section in a plane at right angles to the plane of Fig. 3.

Fig. 5 is a detailed view taken in transverse section through the devices of Figs. 3 and 4.

Fig. 6 is a fragmentary detail showing in section a valve seating arrangement slightly modified from the disclosure of Fig. 3.

Fig. 7 is a fragmentary detail view on a somewhat reduced scale illustrating a modified embodiment of the invention and a preferred manner in which the devices of the invention may be mounted.

Fig. 8 is a front elevation on a greatly reduced scale of a farm tractor equipped with an air pre-cleaner embodying the invention.

Like parts are identified by the same reference characters throughout the several views.

The pipe 9 may be taken, for example, to be the pipe which supplies air to a carburetor or it may, as suggested in Fig. 4, be the intake pipe at the top of a conventional dust filter 10, from which pipe 11 leads to a carburetor. The bell-shaped fitting 15 at the top of pipe 9 supports a multiple chambered screened device which, as shown, happens to be of generally cylindrical outline, comprising a central partition 16 between semi-tubular screens 17 and 18 within which are the chambers 19 and 20 closed at their top by a common cover 21.

An oscillatory valve plate 25 is mounted on a rock shaft 26 against which bears packing 27 connected with the partition 16. Spaced seats generally radial with respect to the axis of oscillation of rock shaft 26 may be provided by applying ribs 28, 29, in the interior of the bell-shaped fitting 15 as shown in Fig. 3, or by incorporating within the bell-shaped fitting 15 throat members 30, 31 against the margins of which the valve 25 may seat as suggested in Fig. 6.

In either case, it will be apparent that when the valve 25 is thrown to the left as viewed either in Fig. 3 or Fig. 6, all communication will be cut off between chamber 19 and pipe 9, the entire air supply for part time being drawn from chamber 20.

When the valve 25 is swung to the right to engage seat shoulder 29 in Fig. 3, or the corresponding seat at the margin of the throat 31 in Fig. 6, chamber 20 will be cut off and the entire air supply for pipe 9 will be drawn from chamber 19.

The rock shaft 26 has an upwardly turned arm 32 at its outer end (Fig. 4) and this may conveniently be provided with a counterweight 33 which tends to hold the valve 25 seated in one or the other of the extreme positions of oscillation. Without anything further, the valve will be self-operating to cut off one chamber when the screen wall thereof becomes clogged and to place the other chamber in communication with the air intake 9. Thereupon the clogged screen will free itself by gravity of the leaves, straw, paper or other like materials clinging thereto so that, when the valve swings in the other direction, the chamber which originally was clogged will have a clean, or substantially clean, screen through which intake air may again be thrown.

The shifting of the valve to connect the one chamber or the other to the discharge, or exhaust, pipe 9 is automatically effected by pressure differentials as follows:

In Fig. 3, the counterweight 33 is holding valve 25 against seat 28. Air is entering through screen 18 and chamber 20. Meantime the screen 17 of chamber 19 is freeing itself of the foreign matter held exteriorly to the screen by air pressure. The gravity discharge of such foreign matter from either screen is aided, in actual practice, by vibration such as is common in engines of all kinds and particularly in the engines used in agricultural equipment. As long as cleaning screen 18 remains open, the interior chamber 20 will be substantially at atmospheric pressure, as will the interior of chamber 19. However, as foreign matter collects on the outside of screen 18 through which the air is being drawn, flow into chamber 20 will gradually be reduced and consequently the engine vacuum communicated through pipe 9 will make itself felt in chamber 20. There will no longer be sufficient air admitted through the screen to relieve such vacuum. Since chamber 19, through which no air is flowing, and the screen which is now free, will remain at atmospheric pressure, it will be apparent that ultimately the partial vacuum on one side of the valve 25 and the atmospheric pressure on the other must result in throwing the valve 25 from its position against seat 28 in opposition to such bias as is afforded by the counterweight 33. As soon as the valve is displaced from shoulder 28, the bias of the counterweight, which thereupon moves to a more nearly vertical position, is decreased and as the counterweight passes above the vertical plane through rock shaft 26, it will acquire a bias in the opposite direction whereby to complete abruptly the transition movement of valve 25 toward valve seat 29. This will completely cut off chamber 20 from the suction pipe 9 and will open chamber 19 which will thereupon supply all the air required by pipe 9 until its screen 17 becomes clogged, whereupon the valve will automatically throw to its original position to again draw air from chamber 20 and cut off chamber 19.

Engine vibration will not only tend to clear the screens of debris entrained by the air but will also assist in throwing the valve, for the lurching of the tractor or other agricultural implement on which the engine is mounted will usually, with some frequency, reduce or reverse the bias of the counterweight 33.

To assist in this action, I may extend rock shaft 26 as shown at 35 in Figs. 1 and 2, providing it with another arm at 36 having a projecting finger 37 oscillatory between the flanges 38, 39 of a pendulum 40 pivoted at 41 and weighted at 42. A device having such a pendulum is preferably installed on a tractor or the like in the position roughly indicated in Fig. 8 where the swing of the pendulum would be transverse with respect to the tractor so that the pendulum will be influenced to a maximum degree by the lurching of the tractor as it traverses rough ground. With the pendulum hanging vertically, as shown in Fig. 1, the stop flanges 38, 39, will permit an unimpeded complete range of oscillation to the valve 25, rock shaft 26, arm 36, and finger 37. With the pendulum hanging vertically, the rock shaft will have no bias other than that provided by the counterweight 33, as previously described. However, the least oscillation of the apparatus will result in a tilting of the pendulum in one direction or the other, whereupon one of its flanges 28, 29 will engage finger 37 to displace the rock shaft, thereby tending to throw it and valve 25 to the opposite position. The pendulum has a very limited permissible range of oscillation defined by engagement of its slotted portion 43 over the rock shaft extension 35. Within this range, it will, with considerable frequency, throw the valve from one side to the other so that the drawing of air from chambers 19 or 20 will no longer be dependent upon the partial clogging of the screens of such chambers. Since the valve is reversed before such screens become clogged, it will be apparent that the reversal for cleaning the screens will occur without any material or substantial change in air pressure and consequently the flow of air will remain substantially constant despite the valve shifting movements which from time to time result in cleaning the respective screens.

In the construction shown in Fig. 7, I have provided at 45 a pneumatic motor such as that used to operate a windshield wiper and have connected this by hose 46 with the air pipe 11 below the cover 10. The pneumatic motor 45 may be made to oscillate the valve 25 with great regularity at any desired frequency and when this arrangement is used, it is preferred to dispense with the counterweight 33.

It will be apparent that in all the forms of my invention I provide a plurality of inlet chambers individually screened and having valve means automatically shifted to draw air through one chamber or another, whereby a screen relieved of suction will automatically clean itself to be available for a successive use. In the preferred embodiments of the invention, a single valve serves to determine whether one chamber or the other is to supply the air and in all cases this single valve is automatically operated, preferably without any separate power connection of any kind.

Although my improved pre-cleaner is fully automatic, it is extremely simple, compact and inexpensive and, properly installed, will enable the screens to function indefinitely without any effort on the part of the operator.

I claim:

1. In a device of the character described, the combination with a plurality of chambers provided with intake screens exposed to the atmosphere and positioned to arrest foreign matter entrained in air admitted through said screens to the respective chambers, said screens being arranged to discharge such matter by gravity when the flow of air through the respective screens is cut off, an air exhaust passage, a fitting leading to said passage from the respective chambers and provided with valve seat means, and a single valve in the path of air leaving said chambers via said fitting and controlling flow from said chambers to said passage, said valve being provided with means for mounting it for movement from one seat to the other for effecting such control.

2. The device of claim 1 in which the mounting means for the valve comprises a rock shaft with respect to which the seats are substantially radial, the valve being pendent from the rock shaft and the rock shaft being provided with biasing means selectively adapted to urge the valve toward the respective seat with which it is engaged.

3. The device of claim 2 in which the valve controlling means comprising a rocker arm on said shaft, a pendulum, an interacting means carried by the pendulum and said arm for transmitting to said valve oscillatory movement of the pendulum.

4. The device of claim 1 in which the valve controlling means comprises a pneumatic motor having connections for its operation and provided with motion transmitting connections to said shaft.

5. The combination with a fluid passage, of a plurality of inlet chambers therefor respectively provided with inlet screens for admitting fluid toward said passage and excluding foreign matter entrained with such fluid, each of said screens being positioned for gravity discharge of arrested foreign matter when fluid flow therethrough is arrested, and valve means between said chambers and passage having positions respectively adapted to arrest fluid flow from a selected chamber to said passage while admitting fluid to said passage through the other of said chambers, together with valve control mechanism operatively connected with the valve means for urging it selectively toward its respective positions aforesaid.

6. The combination with a fluid passage, of a cylindrical casing having a peripheral screening wall provided with a cross partition defining a plurality of inlet chambers within such wall, said chambers both communicating with said passage for admitting fluid thereto, and said wall constituting means for excluding foreign matter entrained with such fluid, said wall being arranged for gravity discharge of arrested foreign matter when fluid flow therethrough is arrested, valve seats between the respective chambers and said passage, and valve means operatively movable to and from said seats in alternation whereby said valve means is adapted alternately for interrupting fluid flow from one of said chambers to said passage while admitting fluid to said passage through the other of said chambers.

NORMAN R. KRAUSE.

REFERENCES CITED

The following references are of record in the file of this patent:

UNITED STATES PATENTS

| Number | Name | Date |
| --- | --- | --- |
| 182,672 | Howell | Sept. 26, 1876 |
| 1,341,129 | Hopkins | May 25, 1920 |
| 2,157,307 | Savage | May 9, 1939 |

FOREIGN PATENTS

| Number | Country | Date |
| --- | --- | --- |
| 518,461 | Germany | Feb. 16, 1931 |